United States Patent Office 3,100,782
Patented Aug. 13, 1963

---

3,100,782
PROCESS FOR PREPARING 3-METHYL-CHROMONE
Robert Joly, Montmorency, and Robert Bucourt, Villiers-le-Bel, France, assignors to Roussel-UCLAF, Societe Anonyme, Paris, France, a corporation of France
No Drawing. Filed Sept. 21, 1961, Ser. No. 139,606
Claims priority, application France June 5, 1959
5 Claims. (Cl. 260—345.2)

This invention relates to a process for the preparation of 3-methyl chromone by a condensation of ethyl formate and o-hydroxypropiophenone using solutions of organozinc compounds in N,N-dialkylamides as condensation agents.

The solutions of the organozinc compounds in N,N-dialkylamides used according to the present invention constitute important reagents for organic synthesis which are different in their behavior from classic organozinc compounds obtained in solution in ether or tetrahydrofuran. These solutions are described in copending applications Serial Nos. 11,167 and 11,155, both filed February 26, 1960, now United States Patents Nos. 3,040,079 and 3,040,078, respectively, of which the present application is a continuation-in-part. It will be seen as the description proceeds, that they act as condensation agents which make it possible to prepare very easily methylchromone starting from o-hydroxypropiophenone and ethyl formate.

The condensation agents are solutions of organozinc compounds which may be represented by the general formula R₁ZnY, in an N,N-dialkylamide having the formula

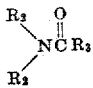

wherein R₁ and R₂ represent lower alkyl radicals, R₃ is selected from the group consisting of hydrogen, methyl and ethyl radicals, and Y is a member selected from the group lower alkyl, halogen, methosulfate and ethosulfate radicals.

An object of the invention is the process for the preparation of 3-methylchromone from o-hydroxypropiophenone and ethyl formate utilizing said solutions of organozinc compounds in N,N-dialkylamides.

This, and other objects of the invention will become more apparent as the description proceeds.

The process for the preparation of the organozinc salts in solution, which are used as the condensation agents, is described in copending application Serial No. 11,167, now United States Patent No. 3,040,079. This process consists essentially of reacting the desired lower alkyl halide or sulfate compound directly with zinc in the presence of an N,N-dialkylamide having the formula

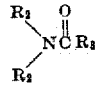

wherein R₂ and R₃ have the meanings assigned above, preferably in N,N-dimethylformamide, but other dialkylamides such as N,N-dimethylacetamide, N,N-diethylformamide, N,N-diethylacetamide, N,N-dimethylpropionamide, etc., may also be used.

In general, the reaction is carried out at slightly elevated temperatures which are readily attainable in industry, advantageously between 20° and 100° C.

As alkyl compounds, we can use such compounds as methyl iodide, methyl bromide, ethyl bromide, ethyl chloride, propyl iodide, n-butyl bromide, isopropyl bromide, isoamyl bromide, dimethyl sulfate, diethyl sulfate, etc. The methyl derivatives are preferred when preparing organozinc compounds for organic synthesis, and these and the other alkyl derivatives are preferred when preparing organozinc compounds for use as alkylating agents.

In order to activate the reaction, it is often advantageous to employ a catalyst, such as the iodide of the alkyl derivative in question.

The process for the preparation of the solutions of the dialkylzinc condensation agents consists essentially of heating a solution of a lower alkylzinc halide in an N,N-dialkylamide having the formula

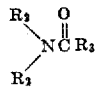

where R₂ and R₃ have the meaning given above, under a vacuum and distilling off solution of dialkylzinc in an N,N-dialkylamide, as described in copending application Serial No. 11,155, now United States Patent No. 3,040,078.

The alkylzinc halides useful in the process of our invention are, for example, methylzinc bromide, methylzinc chloride, methylzinc iodide, ethylzinc bromide, n-propylzinc bromide, isopropylzinc iodide, n-butylzinc bromide, isoamylzinc bromide, etc. For economy and convenience, we prefer to use methylzinc bromide. The other alkylzinc halides, of course, are required as starting materials to produce dialkylzinc solutions useful in general alkylation reactions.

The dialkylzinc distilling over with N,N-dialkylamide according to the process will vary in concentration depending on the relative boiling points of the two components. Any concentration of the solution of dialkylzinc in N,N-dialkylamide containing about 3 gram-mols per kilogram of dialkylzinc or less can be used in the various reactions. The upper limit of concentration depends on the solubility of the particular dialkylzinc. For purposes of condensing ethyl formate with o-hydroxypropiophenone to form 3-methylchromone, we prefer to use a concentrated solution.

In the preparation of the product 3-methylchromonone, the reaction may be conducted in any number of ways.

In one method, o-hydroxypropiophenone may be added to the solution of the dialkyl zinc or alkylzinc halide or sulfate in N,N-dimethylformamide while cooling. The mixture is heated to a temperature at between about 45° and 65° C. until there is no further evolution of gas. It is advantageous if the amount of organozinc compound used is in excess of the amount required. The reaction mixture is then cooled to between about 5 to 20° C. and ethyl formate is added. The reaction is exothermic and cooling is applied for a few hours. The mixture is then allowed to stand for several days at room temperature.

The product may then be separated. The excess zinc compound is decomposed with acetic acid, for example. The mixture is then diluted with water, and extracted with a suitable solvent, such as ethyl acetate, crystallized and purified by distillation.

The reaction may also be conducted by first adding the ethyl formate slowly with agitation to the dialkyl or alkylzinc halide or sulfate solution. The o-hydroxypropiophenone is then added and the mixture is heated at between about 45° and 65° C. until the evolution of gas ceases. The extraction of the product is conducted as described above.

The following examples, which are non-limiting, illustrate the invention. The temperatures are indicated in degrees centigrade.

EXAMPLE I

*Preparation of a Methylzinc Bromide Solution*

400 gm. of zinc (powder, leaflets or chips) are admixed with 300 cc. of N,N-dimethylformamide and 5 cc. of methyl iodide (as catalyst) and a slow stream of methyl bromide is introduced into this mixture. The temperature rises to 50–55° C. within 15 minutes. The reaction proceeds in a fairly vigorous manner and the reaction mixture is cooled with an ice-water bath. After a few minutes the flow of methyl bromide is accelerated and 700 cc. of dimethylformamide are introduced in the course of ½ hour, all the while maintaining the temperature at 45–50° C.

The introduction of methyl bromide is continued while maintaining the temperature at 45–50° C. until the zinc completely disappears, which requires approximately three hours. Toward the end of the operation, the reaction is no longer sufficiently exothermic and the reaction mixture is heated in order to maintain the temperature constant. The methylzinc bromide solution titrates at 2.8 to 2.9 gram-mols per kilogram of solution.

EXAMPLE II

Preparation of a Dimethylinc Solution

The entire solution obtained according to Example I is placed in a conventional distillation apparatus. The solution is then distilled under vacuum of 17 mm. Hg. The slight excess of methylbromide present in the reaction mixture is eliminated and a mixture of dimethylformamide and dimethylzinc is distilled off. The fractions which distill over up to 60–63° C. and then from 60–63° C. to about 70° C. are collected separately. The first fraction, which is a cloudy, colorless solution weighs 770 to 775 gm. and contains from 3 to 3.2 gram-mols of dimethylzinc per kilogram of solution. The second fraction weighs 260 to 265 gm. and contains 1.2 to 1.4 gram-mols of dimethylzinc per kilogram. The total yield based on metallic zinc is 87–93%.

Dimethylzinc may be prepared in analogous fashion starting from methylzinc iodide or methylzinc chloride in N,N-dimethylformamide.

EXAMPLE III

Preparation of a Diethylzinc Solution

A solution of ethylzinc bromide in N,N-dimethylacetamide containing 3 gram-mols of ethylzinc bromide per kilogram is heated under a vacuum of 17 mm. Hg in a distilling apparatus. After elimination of a small fraction of a low boiling material, approximately two-thirds of the solution is distilled off and collected. The distillate is a solution of diethylzinc in N,N-dimethylacetamide.

EXAMPLE IV

Preparation of 3-Methylchromone With the Aid of a Dimethylzinc Solution (a) *With preliminary action of dimethylzinc upon o-hydroxypropiophenone.*—19.45 gm. of o-hydroxypropiophenone are added dropwise to 107 gm. of a solution of dimethylzinc in N,N-dimethylformamide containing 3 gram-mols of dimethylzinc per kilogram, while agitating and cooling the mixture. During the introduction of the o-hydroxypropiophenone, 3.450 liters of methane are evolved, i.e., one mol per mol of o-hydroxypropiophenone. Thereafter, the reaction mixture is heated at 53–55° C. until the evaluation of methane ceases, which takes approximately 2 hours. The reaction mixture is cooled to 10° C. and then 24 gm. of ethyl formate are added all at once. A slow exothermic reaction is produced, accompanied by a slight evolution of gas. The agitation is stopped and the clear yellow solution is allowed to stand for a few hours while cooling it on an ice-water bath. Thereafter, the solution is allowed to stand at room temperature for 7 days. The reaction solution turns reddish orange, a crystallization appears and finally spreads through the entire mass.

The excess zinc compound is decomposed by adding 41 cc. of acetic acid over a period of one hour, accompanied by agitation and cooling. 600 cc. of water are added and the resulting mixture is extracted several times with ethyl acetate. The extract solutions are combined and washed successively with water, with a saturated solution of sodium bicarbonate and again with water and dried over sodium sulfate. The ethyl acetate is evaporated. The residue readily crystallizes at 20° C. By distillation in a vacuum, 17.7 gm. (which is 85.5% of theory) of pure 3-methylchromone are obtained which passes over at 150°–152° C. under a pressure of 17 mm. of mercury. This compound has a melting point of 71°–72° C.

(b) *By direct action of dimethylzinc upon the reaction mixture.*—24.6 gm. of ethyl formate are added slowly and while agitating to 110.5 gm. of a solution of dimethylzinc (3 gram-mols per kilogram) in N,N-dimethylformamide. Thereafter, 19.8 gm. of o-hydroxypropiophenone are introduced over a period of ½ hour. The resulting mixture is heated for two and a half hours at about 50° C. until the evaluation of gas ceases. It is then cooled to 20° C. and the excess of zinc compound is decomposed by the addition of 42 cc. of acetic acid while cooling. The mixture is diluted with water, extracted with ethyl acetate and crystallized as previously described. The compound is distilled in a vacuum and the fraction boiling at 150°–151° C. is collected. Pure 3-methylchromone is thus obtained, having a melting point of 71°–72° C., in a yield of 17.4 gm., which is 82.5% of theory.

EXAMPLE V

Preparation of 3-Methylchromone With Methylzinc Bromide

A stream of methyl bromide is introduced into a mixture consisting of 90 gm. of powdered zinc, 66 cc. of dimethylformamide and 3 cc. of methyl iodide (as catalyst). The temperature reaches 50° C. in 10 minutes and at that point the reaction proceeds fairly vigorously. The reaction mixture is cooled to maintain the temperature at about 50° C. and 156 cc. of dimethylformamide are introduced over a period of one hour. The flow of methyl bromide is maintained until all of the zinc has completely disappeared which requires 3½ hours. At the end of the reaction it is necessary to maintain the temperature at 50° C. by heating.

The reaction mixture is then cooled to 30° C. and 67.5 cc. of ethyl formate are introduced over a period of 10 minutes. 50 gm. of o-hydroxypropiophenone are then added over a period of one hour. A reaction develops which is accompanied by the evolution of methane. Thereafter, the reaction mixture is heated to 60° C. until the evolution of gas ceases, which requires approximately three hours. The mixture is cooled to 20° C. and the excess of methylzinc bromide is decomposed by the very slow addition of 88 cc. of acetic acid. Thereafter the mixture is diluted with 1700 cc. of water and extracted with 600 cc. of ethyl acetate and then four times with 250 cc. aliquots of the same solvent. The combined extracts are washed with water, with a saturated solution of sodium bicarbonate and again with water. After drying over sodium sulfate the solvent is distilled off in a vacuum to yield 50.9 gm. of a thick oil. This oil is distilled in a vacuum (17 mm. Hg) to obtain 6.2 gm. of a first fraction having a boiling range up to 148° C. and 37.5 gm. of principal fraction having a boiling range of 148° to 150° C. The principal fraction (yield=70%) is practically pure 3-methylchromone having a melting point of 71°–72° C. The first fraction is made up of 3-methylchromone contaminated with a small amount of o-hydroxypropiophenone. The first fraction is subjected to a treatment with 10 cc. of 1N sodium hydroxide by trituration. The mixture is then vacuum filtered, the filter cake is washed with water and dried at 40–50° C. to give 5.875 gm. (which is 11%) of 3-methylchromone melting at 71–72° C., or an overall yield of about 81%.

For optimum results in utilizing the solution of an organozinc salt in an N,N-dialkylamide it is preferable to maintain a fairly concentrated solution. The concentration should be above about 0.1 mol of organozinc salt for every kilogram of solution and below the saturation point for the particular organozinc salt. For use in chemical synthesis, however it is obvious that more dilute solutions may be employed at the expense of reaction speed and completeness.

The preceding examples are illustrative of the invention. It is to be understood, however, that various changes and modifications can be made without departing from the spirit of the invention or the scope of the appended claims.

We claim:

1. In the process of preparing 3-methylchromone by the condensation of ethyl formate with o-hydroxypropiophenone in the presence of an organozinc compound, the improvement which comprises condensing said ethyl formate with said o-hydroxypropiophenone in the presence of an excess a stable solution of an organozinc compound having the formula $R_1ZnY$, in an N,N-dialkylamide having the formula

wherein $R_1$ and $R_2$ represent lower alkyl, $R_3$ is a member selected from the group consisting of hydrogen, methyl and ethyl, and Y is a member selected from the group consisting of lower alkyl, halogen, methosulfate and ethosulfate said condensation being conducted at a temperature between about 20° to 100° C.

2. In the process of preparing 3-methylchromone by the condensation of ethyl formate with o-hydroxypropiophenone in the presence of an organozinc compound, the improvement which comprises condensing said ethyl formate with said o-hydroxypropiophenone in the presence of a 25 to 100 percent excess of the stoichiometric amount of a stable solution of an organozinc compound having the formula $R_1ZnY$, in an N,N-dialkylamide having the formula

wherein $R_1$ and $R_2$ represent lower alkyl, $R_3$ is a member selected from the group consisting of hydrogen, methyl and ethyl, and Y is a member selected from the group consisting of lower alkyl, halogen, methosulfate and ethosulfate said condensation being conducted at a temperature between about 45° and 65° C.

3. In the process of preparing 3-methylchromone by the condensation of ethyl formate with o-hydroxypropiophenone under anhydrous conditions in the presence of an organozinc compound, the improvement which comprises condensing said ethyl formate with said o-hydroxypropiophenone in the presence of a 25 to 100 percent excess of the stoichiometric amount of a stable solution of an organozinc compound having the formula $R_1ZnY$, in an N,N-dialkylamide having the formula

wherein $R_1$ and $R_2$ represent lower alkyl, $R_3$ is a member selected from the group consisting of hydrogen, methyl and ethyl, and Y is a member selected from the group consisting of lower alkyl, halogen, methosulfate and ethosulfate said condensation being conducted at a temperature between about 45° and 65° C.

4. In the process of preparing 3-methylchromone by the condensation of ethyl formate with o-hydroxypropiophenone under anhydrous conditions in the presence of an organozinc compound, the improvement which comprises condensing said ethyl formate with said o-hydroxypropiophenone in the presence of a 25 to 100 percent excess of the stoichiometric amount of a stable solution of dimethyl zinc in dimethylformamide said condensation being conducted at a temperature between about 45° and 65° C.

5. In the process of preparing 3-methylchromone by the condensation of ethyl formate with o-hydroxypropiophenone under anhydrous conditions in the presence of an organozinc compound, the improvement which comprises condensing said ethyl formate with said o-hydroxypropiophenone in the presence of a 25 to 100 percent excess of the stoichiometric amount of a stable solution of methyl zinc halide in dimethylformamide said condensation being conducted at a temperature between about 45° and 65° C.

References Cited in the file of this patent
UNITED STATES PATENTS
2,769,015    Mentzer _____ Oct. 30, 1956

UNITED STATES PATENT OFFICE
CERTIFICATE OF CORRECTION

Patent No. 3,100,782                                August 13, 1963

Robert Joly et al.

It is hereby certified that error appears in the above numbered patent requiring correction and that the said Letters Patent should read as corrected below.

Column 3, line 18, for "Dimethylinc" read -- Dimethylzinc --; line 61, for "evaluation" read -- evolution --; column 4, line 17, for "evoluation" read -- evolution --.

Signed and sealed this 25th day of February 1964.

(SEAL)
Attest:

ERNEST W. SWIDER                                      EDWIN L. REYNOLDS

Attesting Officer                                   Acting Commissioner of Patents